(12) United States Patent
Lee et al.

(10) Patent No.: US 7,770,214 B2
(45) Date of Patent: Aug. 3, 2010

(54) APPARATUS, SYSTEM, AND METHOD FOR ESTABLISHING A REUSABLE AND RECONFIGURABLE MODEL FOR FAST AND PERSISTENT CONNECTIONS IN DATABASE DRIVERS

(75) Inventors: Bilung Lee, Fremont, CA (US); Huaxin Gao, San Jose, CA (US); Paul A. Ostler, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 11/736,516

(22) Filed: Apr. 17, 2007

(65) Prior Publication Data

US 2008/0263653 A1 Oct. 23, 2008

(51) Int. Cl.
*H04L 9/32* (2006.01)
*H04L 29/04* (2006.01)

(52) U.S. Cl. .............................. 726/8; 726/4; 713/153; 709/202; 709/227

(58) Field of Classification Search ..................... 726/2, 726/4, 10, 12; 713/151, 156, 155; 705/76; 709/225, 229, 239
See application file for complete search history.

(56) References Cited

U.S. PATENT DOCUMENTS

| | | | |
|---|---|---|---|
| 5,553,242 A * | 9/1996 | Russell et al. ................ 709/227 |
| 5,764,887 A * | 6/1998 | Kells et al. ..................... 726/14 |
| 6,286,104 B1 * | 9/2001 | Buhle et al. ..................... 726/4 |
| 6,725,376 B1 | 4/2004 | Sasmazel et al. ............ 713/201 |
| 7,266,715 B1 * | 9/2007 | Bazzinotti et al. .............. 714/4 |
| 2001/0020274 A1 * | 9/2001 | Shambroom ................ 713/201 |
| 2002/0184507 A1 | 12/2002 | Makower et al. ............ 713/182 |
| 2003/0217148 A1 * | 11/2003 | Mullen et al. ............... 709/225 |
| 2004/0233930 A1 * | 11/2004 | Colby, Jr. .................... 370/464 |
| 2005/0075115 A1 * | 4/2005 | Corneille et al. ......... 455/456.3 |
| 2005/0198379 A1 | 9/2005 | Panasyuk et al. ............ 709/239 |
| 2006/0020598 A1 * | 1/2006 | Shoolman et al. .............. 707/8 |
| 2006/0036715 A1 | 2/2006 | Ghattu ....................... 709/220 |
| 2006/0074955 A1 * | 4/2006 | Kuersch et al. ............ 707/101 |
| 2006/0117106 A1 | 6/2006 | Abdo et al. ................. 709/227 |

(Continued)

OTHER PUBLICATIONS

Oracle 9i JDBC Developer's Guide and Reference, Jun. 2001, Oracle, 9.0.1. Release 1, Chapter 15.*

*Primary Examiner*—William R Korzuch
*Assistant Examiner*—Michael R Vaughan
(74) *Attorney, Agent, or Firm*—Kunzler Needham Massey & Thrope (57) ABSTRACT

An apparatus, system, and method for establishing a reusable and reconfigurable trusted connection within a trusted context. The invention enhances interoperability with any existing authentication methods including the Kerberos, the DCE, and a combination of a user name and a password. The present invention includes common interfaces in a database driver for a middleware server to obtain a trusted connection. The invention enhances trusted context interoperability by allowing different types of trusted connections such as a normal connection, a pooled connection, or even a distribution transaction connection. The database driver generates unique identifiable information once a trusted connection is authenticated that can be utilized to reuse and reconfigure the trusted connection without re-authentication. The present invention allows various types of trusted connections to be established through any authentication mechanisms and allows those trusted connections to be reused and reconfigured, even by a different client, in a fast and persistent way.

10 Claims, 5 Drawing Sheets

U.S. PATENT DOCUMENTS

| | | | |
|---|---|---|---|
| 2006/0123468 A1* | 6/2006 | Bird et al. | 726/4 |
| 2006/0143436 A1* | 6/2006 | Bird et al. | 713/151 |
| 2006/0179312 A1 | 8/2006 | Kelly et al. | 713/169 |
| 2008/0148364 A1* | 6/2008 | Hopen et al. | 726/4 |
| 2008/0162609 A1* | 7/2008 | Bigian et al. | 707/205 |

* cited by examiner

APPARATUS, SYSTEM, AND METHOD FOR ESTABLISHING A REUSABLE AND RECONFIGURABLE MODEL FOR FAST AND PERSISTENT CONNECTIONS IN DATABASE DRIVERS

BACKGROUND OF THE INVENTION

1. Field of the Invention

This invention relates to database drivers and more particularly relates to using database drivers to establish a reusable and reconfigurable model for fast and persistent connections within a trusted context.

2. Description of the Related Art

Figure 1:
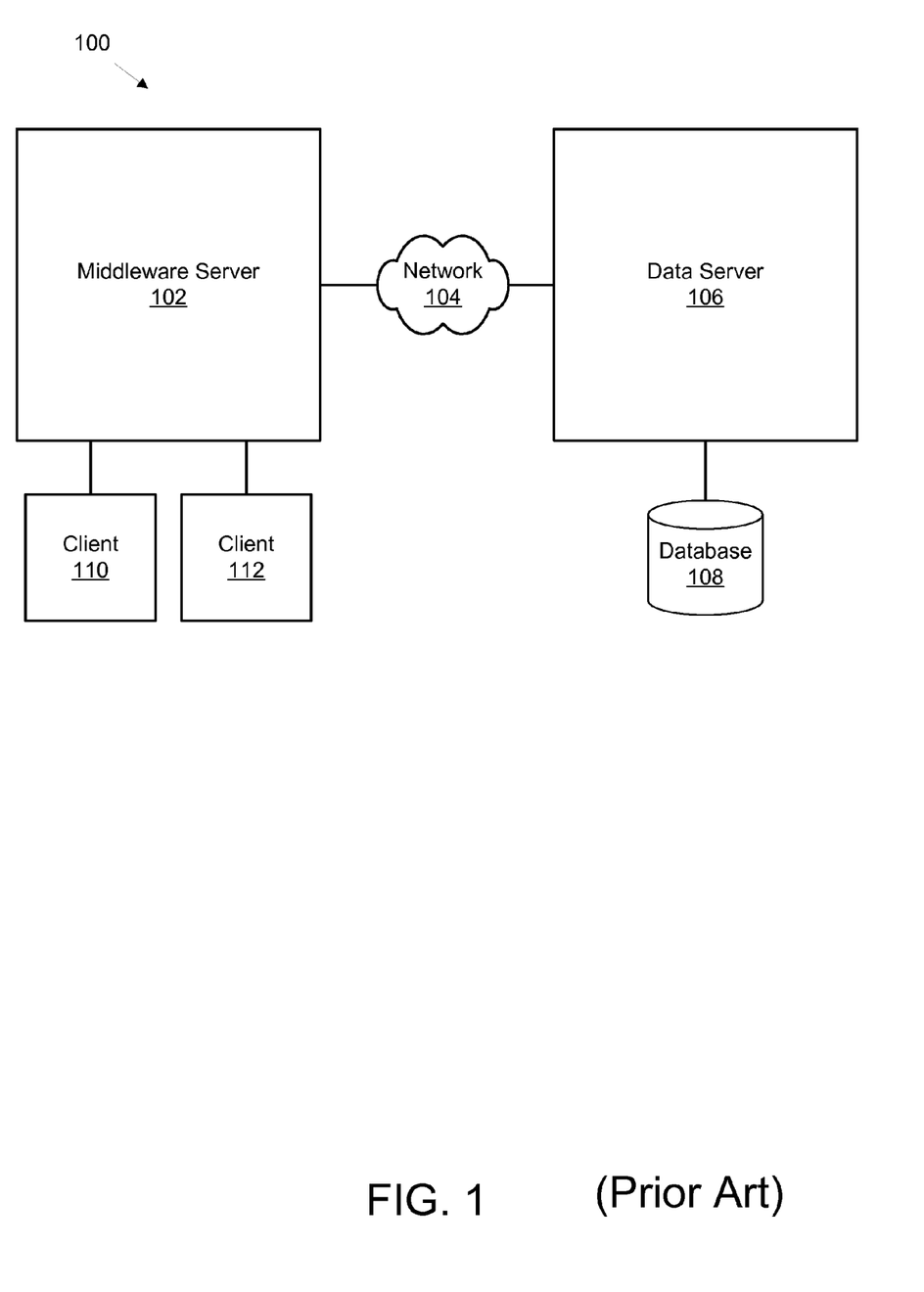
FIG. 1 is a schematic block diagram illustrating one embodiment of a conventional system for allowing end users to access data through a data server in accordance with the prior art.

FIG. 1 depicts a conventional system 100 for allowing end users to access data through a data server. The conventional system 100 includes a conventional middleware server 102, a conventional data server 106, a database 108, and a network 104 connecting the middleware server 102 to the data server 106. End users (not shown) can connect to the middleware server 102, and thus the data server 106, through clients 110, and 112.

Under the popular three-tiered web model, a middleware server 102, such as an application server, at the middle tier is often used to authenticate client applications 110 and 112 and to handle connections to underlying data servers 106 through the use of database drivers. Traditionally, an end user logs onto the middleware server 102, and the middleware server 102 subsequently requests a connection with the data server 106. In order to accomplish this, the middleware server 102 may provide the data server 106 with some form of identification such as a user name and password. The data server 106 then validates the user name and password such that the middleware server 102 is authorized to connect to the conventional data server 106. Using such a connection, data may be accessed on the database 108 through the middleware server 102 and returned to the end user. After a transaction is complete, the connection may be terminated.

However, with regard to this type conventional database system 100, two major issues arise. First, every database access performed by the middleware server 102 requires authorization checking, which takes a significant time and significant processing capacity. Second, the database access under the authorization information provided by the middleware server 102 may actually be performed on behalf of the client application 110 or 112. Under this circumstance, the identity of the client application 110 or 112 may not be propagated to the data server 106, and consequently, there is a loss of end-user accountability.

Furthermore, because access to the database 108 is managed based upon the user identification of the middleware server 102, that middleware server user identification is granted all the privileges required for the actions of all of the end users connecting to the database 108 through the middleware server 102. This results in weakened security because every end user has access to the same set of privileges on the database 108. For example, all end users of the middleware server 102 may access the same data on the database 108 even though the end user themselves may not otherwise be authorized to access the data. Security for the database 108 is thereby weakened. Alternatively, each time a new end user accesses the database 108 through the middleware server 102, the connection between the middleware server 102 and the data server 106 is re-established based on the identification of the end user. Providing new connections for each end user ameliorates the weakening of security discussed above. However, overhead is greatly increased and performance suffers significantly.

Today, advanced database servers support trusted context technology, which enables the identity of the client application to be propagated, and to be used in related database accesses. U.S. Patent Application 2006/0143436 (hereinafter the "'436 application") entitled "Method and system for providing and utilizing a network trusted context" discloses a method and system for establishing a trusted context and is herein incorporated by reference. A trusted context allows for the use of trusted connections which allow the identity of a client application 110 or 112 to be propagated to the data server 106 and to be used in related database accesses. The method and system disclosed in the '436 application comprise defining a plurality of trust attributes corresponding to a trusted context between the middleware server 102 and the data server 106 and validating the plurality of trust attributes against a plurality of attributes corresponding to the middleware server 102. The plurality of attributes is provided in a connection request. Then, a trusted context is established in response to the attributes being validated.

Although, trusted context technology provides for the use of trusted connections that can be reused without the need for re-authentication, existing database drivers lack needed interoperability with existing authentication mechanisms, such as the Kerberos mechanism and the DCE (Distributed Computing Environment) mechanism. Furthermore, currently available database drivers lack the interoperability to allow for quick configuration and re-configuration of a trusted connection to provide different types of connections such as a normal connection, a pooled connection, or even a distribution transaction connection. Thus, a need exists for a database driver that provides this type enhanced interoperability.

SUMMARY OF THE INVENTION

From the foregoing discussion, it should be apparent that a need exists for an apparatus, system, and method that establishes a reusable and reconfigurable connection within a trusted context that is interoperable with any existing authentication mechanisms. Beneficially, such an apparatus, system, and method would provide enhanced interoperability in a trusted context environment.

The present invention has been developed in response to the present state of the art, and in particular, in response to the problems and needs in the art that have not yet been fully solved by currently available database drivers. Accordingly, the present invention has been developed to provide an apparatus, system, and method for establishing a reusable and reconfigurable connection within a trusted context that overcome many or all of the above-discussed shortcomings in the art.

The apparatus, system, and method to establish a reusable and reconfigurable connection within a trusted context are provided with a plurality of modules configured to functionally execute the steps of: defining a trusted context between a data server and a middleware server; retrieving a trusted connection within the trusted context for communication with the data server, the trusted connection programmatically defined as one of a normal connection, a pooled connection, and a distribution transaction connection; authenticating the trusted connection via an authentication mechanism using an authentication protocol programmatically defined as one of a Kerberos authentication protocol, a DCE authentication protocol, a user-defined authentication protocol, and a combination of a user name and a password; generating and storing unique identifiable information regarding the trusted connection in a persistent storage; and enabling reuse of the trusted connection without re-authentication based on the unique identifiable information.

These modules in the described embodiments include: a trusted context definition interface configured to communicate with a data server to define a trusted context; a set of trusted connection retrieval interfaces configured to enable retrieval of a trusted connection within the trusted context for secure communication with the data server; an authentication module configured to authenticate the trusted connection using an authentication protocol programmatically defined as one of a Kerberos authentication protocol, a DCE authentication protocol, a user-defined authentication protocol, and a combination of a user name and a password; and a set of connection reuse interfaces configured to enable reuse of the connection with or without re-authentication based on the unique identifiable information.

In various embodiments, the modules further include a set of connection reconfiguration interfaces configured to enable reconfiguration of the trusted connection without re-authentication based on the unique identifiable information.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
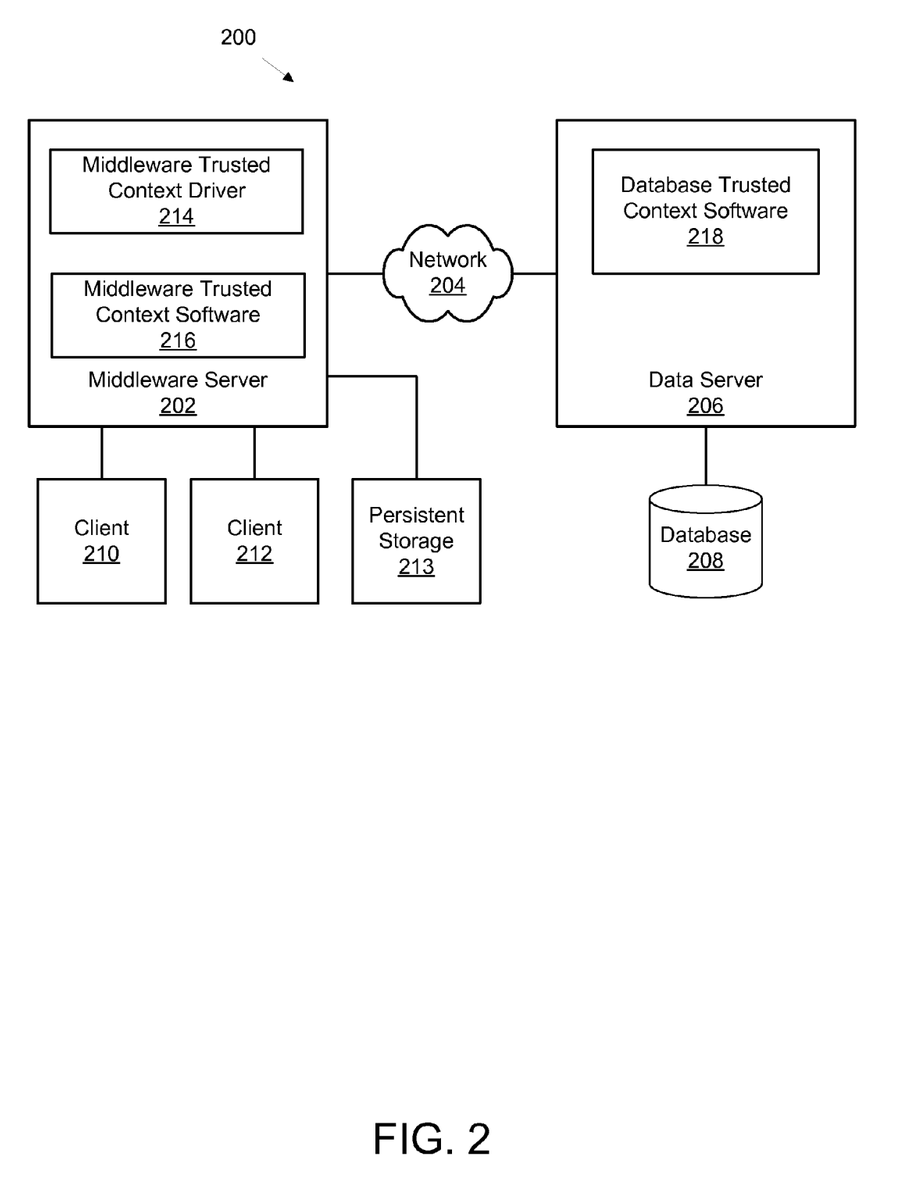
FIG. 2 is a schematic block diagram illustrating one embodiment of a system for allowing end users to access data through a data server in accordance with the present invention.

FIG. 2 depicts a system 200 for allowing end users to access data through a data server in accordance with the present invention. The system 200 includes a middleware server 202 comprising at least one processor and a memory, a data server 206 comprising at least one processor and a memory, a database 208, and a network 204 for connecting the middleware server 202 to the data server 206. End users (not shown) can connect to the middleware server 202, and thus the data server 206, through clients 210, and 212. The persistent storage 213 is accessible by the middleware server 202 and is configured to store data related to a trusted connection such as unique identifiable information that may be utilized in reusing or reconfiguring a trusted connection. The middleware server 202 also preferably includes middleware trusted context software 216 used in creating a trusted context and a middleware trusted context driver 214 used to facilitate the configuration and use of a trusted context including interoperability with various authentication mechanisms and connection types. The data server 206 also preferably includes database trusted context software 218 used in establishing a trusted context between the data server 206 and the middleware server 202. The data server 206 is coupled with a database 208 and manages access to the database 208.

The middleware trusted context software 216 allows the middleware server 202 to request a connection and request that the connection be made as a trusted context if desired. Thus, the trusted context software 216 interoperates with the middleware trusted context driver 214 to establish trusted connections within a trusted context. In one embodiment, the trusted context software 216 includes the code necessary to enable trusted context functionality between a middleware server 202 and a data server 206.

Figure 3:
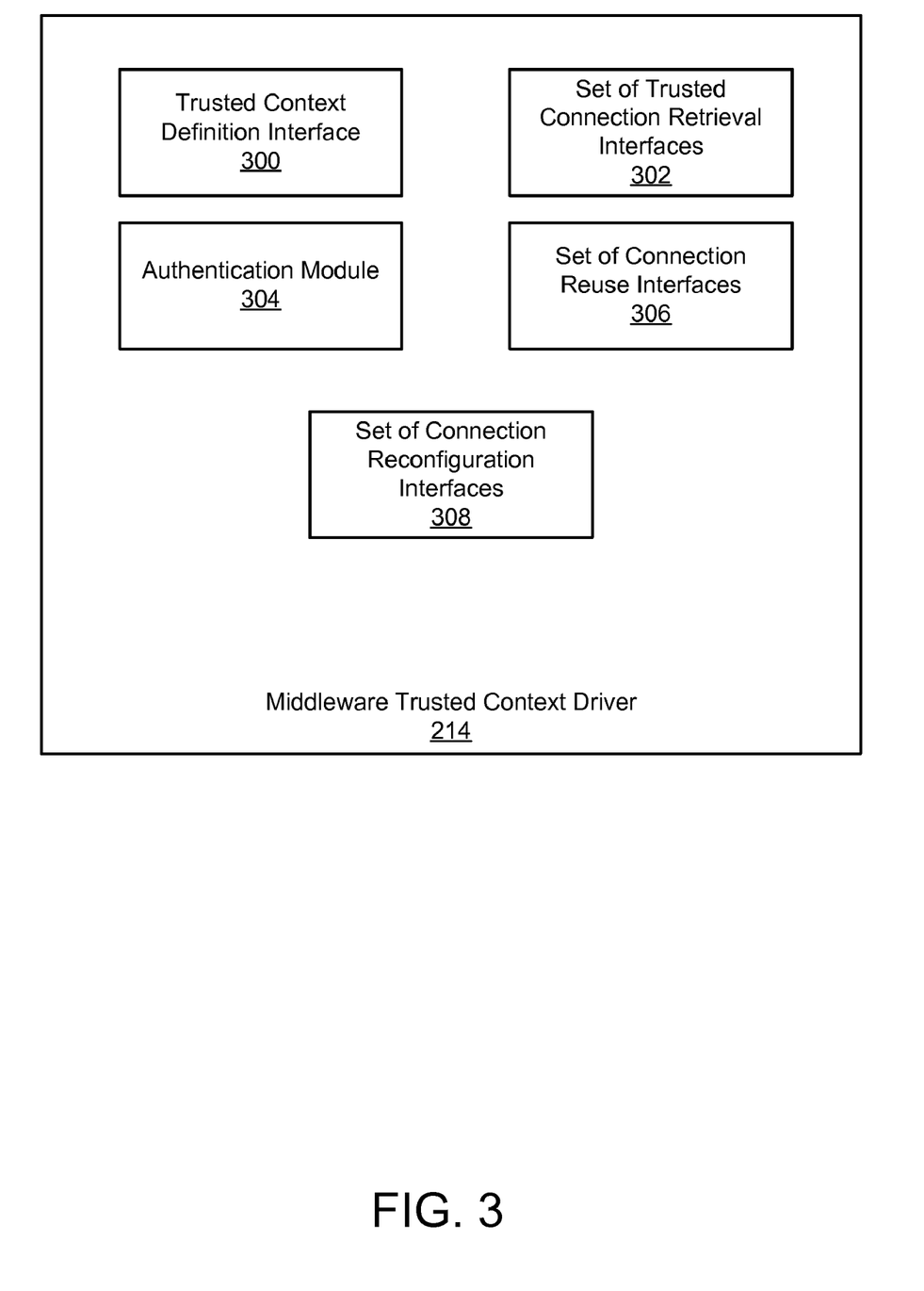
FIG. 3 is a schematic block diagram illustrating one embodiment of a middleware trusted context driver in accordance with the present invention.

FIG. 3 depicts a middleware trusted context driver 214 in accordance with the present invention. The middleware trusted context driver 214 works in conjunction with the trusted context software 216 to facilitate the configuration and use of a trusted connection within a trusted context.

The middleware trusted context driver 214 includes a trusted context definition interface 300, a set of trusted connection retrieval interfaces 302, an authentication module 304, a set of connection reuse interfaces 306, and a set of connection reconfiguration interfaces 308.

The trusted context definition interface 300, in conjunction with the middleware trusted context software 216 and database trusted context software 218 provides communication with the data server 206 to define a trusted context. In one embodiment, the trusted context definition interface 300 receives from a client 110 or 112 a request for a connection with the data server 206. Then, the trusted context definition interface 300 determines whether or not the requested connection is a trusted connection. If a trusted connection has been requested, the trusted context definition interface 300 communicates with the data server 206 to define the desired trusted context. In one embodiment, the definition may include a set of roles and attributes that are associated with the trusted context or with an end user, and which are validated by the database trusted context software 218.

For example, access to database objects of the database 208, authorization of end users, and other privileges granted to end users may be managed through the use of roles. For such roles, any privilege granted to a role would be granted to the end user. A role could also be associated with individual end users or subsets of the end users of the trusted context. For such a role, only the associated end user(s) would inherit the privileges associated with the role. Roles may thus include data related not only to the privileges granted, but information, such as end user identification, required for the privilege to be granted. Roles may also override relevant defaults for the trusted context, replacing the appropriate defaults with rules for the roles. Thus, the roles allow the trusted context to be managed at a finer level.

In various embodiments, attributes may be used to determine whether a particular request for a connection is a candidate for a trusted context. Thus, in one embodiment, only requests asking for a trusted context would be candidates for a trusted context. In another embodiment, any request from the middleware server 202 may be a candidate for a trusted context. Examples of attributes for defining a trusted context include, but are not limited to, the user identification for the middleware server 202, attributes of the specific connection that can be trusted such as the system authorization id, encryption, authentication, protocol and job name, as well as the IP address of or domain name for the middleware server connection to the data server 206. In an alternate embodiment, attributes of the client 210 or 212 using the connection might be used to define the trusted context, such as the IP address of the client 210 or 212. In such an embodiment, the middleware server 202 would provide the identity of the client 210 or 212.

Once the trusted context is defined by the trusted context definition interface 300, the connection can be managed based upon the trusted context. In particular, the middleware trusted context driver 214 utilizes the roles, attributes, and/or other data to manage the trusted context. For example, access to certain data objects of the database may be restricted for certain end users. Some or all of the users may also be able to reuse the connection with or without re-authentication.

Once the trusted context is defined by the trusted context definition interface 300, a client 210 or 212 may request a trusted connection within the trusted context. A trusted context is one which is believed to be secure for at least some purpose and is a candidate for re-use with or without re-authentication of the end user. In various embodiments, multiple trusted connections can be made within a single trusted context based on the trusted context definition. Thus, a trusted connection is a connection established between at least one client 210 or 212 and the data server 206 via the middleware server 202 based on a trusted context definition. The set of trusted connection retrieval interfaces 302 enables retrieval of various types of connections such as a normal connection, a pooled connection, or a distribution transaction connection. A user may establish any particular type of connection as long as it is allowed by the trusted context definition. Additionally, the set of trusted connection retrieval interfaces 302 allows for the connection type to be reconfigured with or without re-authentication.

When a trusted connection request is received by the set of trusted connection retrieval interfaces 302, the authentication module 304 authenticates the trusted connection with the data server 206 to verify that the trusted connection is allowed within a particular trusted context definition. For example, in one embodiment, the authentication module 304 may pass information such as a user name and password to the data server 206 which the data server 206 then verifies as either valid or invalid. If the user name and password are authenticated, then the data server 206 responds that authentication has taken place. Once a trusted connection is authenticated, unique identifiable information related to the trusted connection may be stored in a persistent storage 213 that is accessible by the middleware server 202 as well as by clients 210 and 212. Subsequently, the unique identifiable information can be used in the reuse and reconfiguration of the trusted connection. Because it is stored in a persistent storage 213, re-authentication need not take place even in the event of a loss of service such as a power outage.

In one embodiment, the unique identifiable information contains raw binary information to provide security on the client side. This information ensures that a user who attempts to reuse or reconfigure the trusted connection is allowed to do so under the trusted context definition. In the event a connection is reused or reconfigured, if this unique identifiable information doesn't match the information stored within the trusted connection, an error condition will be raised.

The authentication module 304 is interoperable with different types of authentication mechanisms previously unavailable in a trusted context environment such as a Kerberos mechanism, a DCE (Distributed Computing Environment) mechanism, or other user defined mechanisms as will be recognized by those of skill in the art. For example, in one embodiment, rather than a user name and password, the authentication module 304 passes a Kerberos ticket to the data server 206. The data server 206 authenticates a trusted connection if the Kerberos ticket is valid, and then the data server 206 notifies the authentication module 304 whether or not the Kerberos ticket was authentic.

The set of connection reuse interfaces 306 enables the reuse of a previously authenticated trusted connection with or without re-authentication based on the trusted context definition or the unique identifiable information related to the trusted connection. For example, a different user might reuse a trusted connection previously authenticated by another user with or without re-authentication. In one embodiment, a first user might pass the unique identifiable information to a second user as a token. The second user may then be allowed access the trusted connection without re-authentication based on the unique identifiable information. Those of skill in the art will recognize that unique identifiable information may include information in a variety of formats and configurations including a unique connection identifier, a binary value, a text value. Preferably, the unique identifiable information is of a length, and may or may not include encryption measures, such that threats of duplication or compromise as minimized.

The set of connection reconfiguration interfaces 308 enables reconfiguration of a trusted connection by a user with or without re-authentication based on the trusted context definition or unique identifiable information. For example, a user might reconfigure a trusted connection as a pooled connection instead of a normal connection. Or, in another embodiment, a user might change the properties of the trusted connection such as timeout locking, username encryption, trace file location, or read/write access. This might be accomplished, in one embodiment, by changing an attribute or role value that describes the applicable trusted connection.

For example, in one embodiment, a trusted connection might be configured as a read-only connection, meaning that a user of the trusted connection has no write capabilities. In one embodiment, the set of connection reconfiguration interfaces 308 allows a user to change the properties of the trusted connection dynamically from read-only to read/write such that write functionality would also be allowed within the trusted connection after the change is made. In other embodiments, a user might change the path of a trace file related to the trusted connection, or a user might change a property of the trusted connection such that usernames or other data are encrypted for use within the trusted connection. In one embodiment, the change in properties may be communicated to the data server 206 such that the data server 206 operates in accordance with the change in properties. Alternatively, the data server 206 may periodically review the trusted context definition for changes to the properties of the trusted connection. In response to finding a changed property, the data server 206 may communicate the change to various modules of the data server 206 to effectuate the change. In this manner, the set of connection reconfiguration interfaces 308 enables a user to reconfigure a trusted connection with or without re-authentication.

Figure 4:
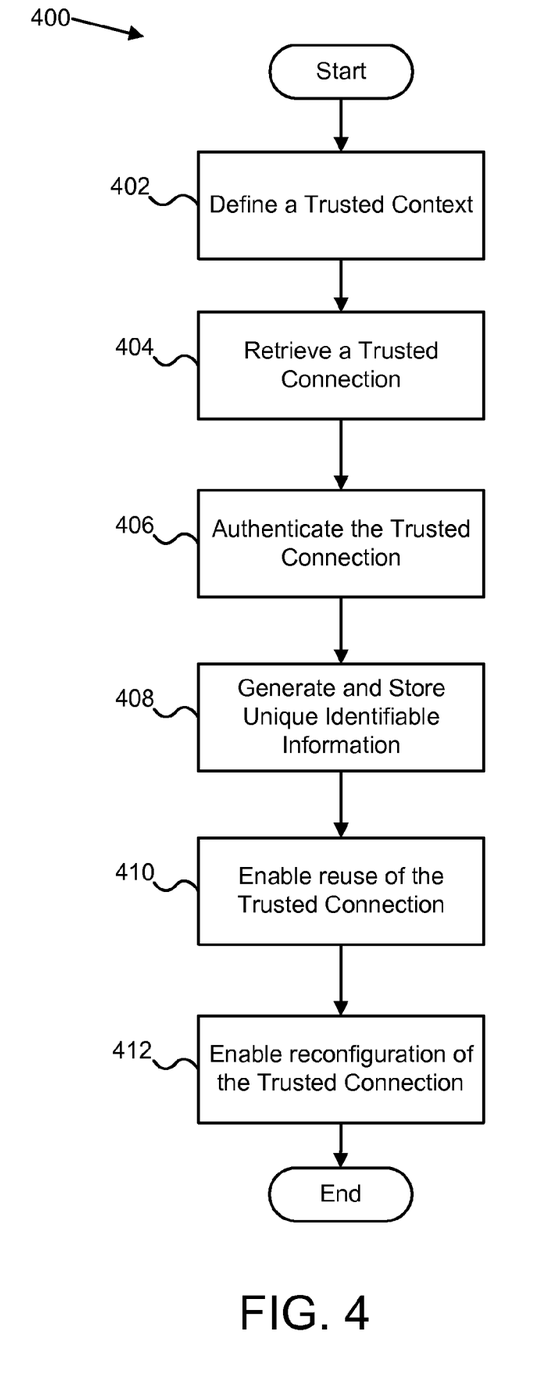
FIG. 4 is a schematic flow chart diagram illustrating one embodiment of a method for establishing a reusable and reconfigurable trusted connection in accordance with the present invention.

FIG. 4 depicts a method 400 for establishing a reusable and reconfigurable trusted connection within a trusted context. The method begins when the trusted context definition interface 300 communicates with the data server 206 to define 402 a trusted context between a middleware server 202 and a data server 206. As described above, in one embodiment, the trusted context may be defined using roles and attributes. Next, the set of trusted connection retrieval interfaces 302 retrieves 404 a trusted connection within the trusted context for communication with the data server 206. In one embodiment, the trusted connection is programmatically defined as one of a normal connection, a pooled connection, and a distribution transaction connection. Programmatically defined as used herein means that the operation is performed by way of computer code. The code may comprise computer-readable code in binary form, source code form, script form, interpretive code form, byte code, or the like. In a preferred embodiment, the computer code is machine readable and human readable, such that a person can modify the programmatic definition to adjust the connection and/or context.

The set of trusted connection retrieval interfaces 302 includes the code necessary to retrieve each of the differently defined types of connections. The code may comprise computer-readable code in binary form, source code form, script form, interpretive code form, byte code, or the like. For example, a user may request a particular type of connection, and the appropriate connection retrieval interface from the set of trusted connection retrieval interfaces 302 will be automatically initialized to respond to the request. In one embodiment, at least one of the trusted connection retrieval interfaces corresponds to each of the various types of available trusted connections. In another embodiment, a single trusted connection interface may include the necessary code for retrieving each of the different types of available trusted connections based on the type of request.

The trusted connection is authenticated 406 by the authentication module 304 to verify that the requested trusted connection is allowed by the trusted context definition. In one embodiment, the trusted connection is authenticated via an authentication mechanism using one of a Kerberos authentication protocol, a DCE authentication protocol, a user-defined authentication protocol, and a combination of a user name and password.

If the trusted connection is authenticated 406 by the data server 206, unique identifiable information regarding the trusted connection is generated and stored 408 in a persistent storage 213. The unique identifiable information may be used to reuse or reconfigure the trusted connection in various embodiments. Next, the set of connection reuse interfaces 306 enables 410 reuse of the trusted connection without re-authentication based on the unique identifiable information. Thus, users may reuse a previously authenticated trusted connection with or without re-authentication at the time of reuse based on the saved unique identifiable information. Finally, the set of connection reconfiguration interfaces 308 enables 412 reconfiguration of the trusted connection with or without re-authentication. The method 400 ends.

In various embodiments of the method 400, each step in the method may include generating an error in response to the failure of the operation of one of the steps. For example, if the authentication module 304 is unable to authenticate a trusted connection, then an error would be reported back to the user.

Figure 5:
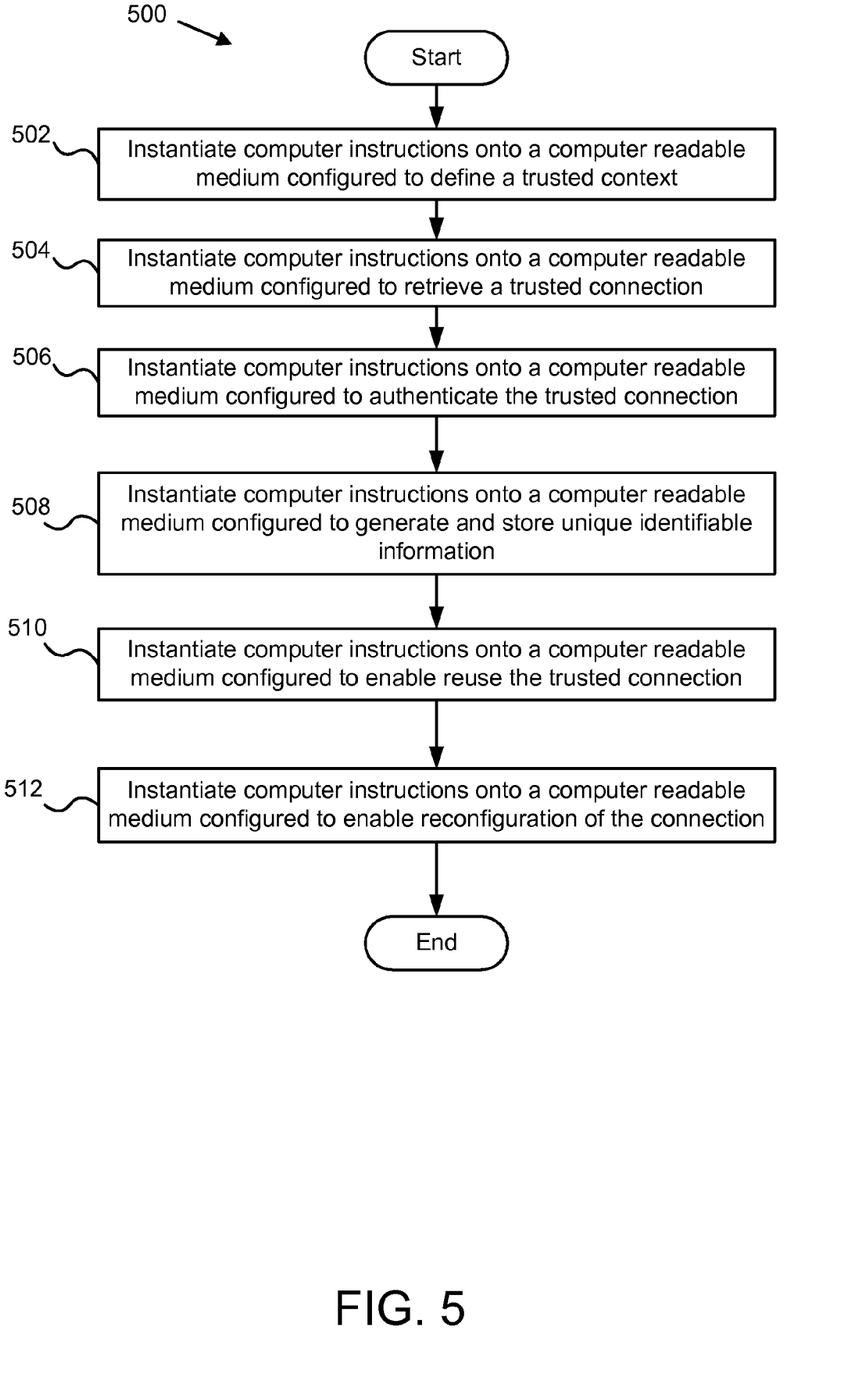
FIG. 5 is a schematic flow chart diagram illustrating one embodiment of a method for making a computer implemented process to enable establishing a reusable and reconfigurable trusted connection in accordance with the present invention.

FIG. 5 depicts a method 500 for making a computer implemented process to enable establishing a reusable and reconfigurable trusted connection within a trusted context. The method 500 begins by instantiating 502 computer instructions onto a computer readable medium configured to define a trusted context between a data server 206 and a middleware server 202. Next, computer instructions are instantiated 504 onto a computer readable medium configured to retrieve a trusted connection within a trusted context for communication with the data server 206. In one embodiment, the trusted connection may be programmatically defined as one of a normal connection, a pooled connection, and a distribution transaction connection. Computer instructions are instantiated 506 onto a computer readable medium configured to authenticate the trusted connection. In one embodiment, the authentication mechanism may be programmatically defined as one of a Kerberos authentication protocol, a DCE authentication protocol, a user-defined authentication protocol, and a user name and password. Then, computer instructions are instantiated 508 onto a computer readable medium configured to generate and store unique identifiable information regarding the trusted connection in a persistent storage 213. The unique identifiable information can then be used to reuse or reconfigure the trusted connection with or without authentication. Next, computer instructions are instantiated 510 onto a computer readable medium configured to enable reuse of the trusted connection without re-authentication based on the unique identifiable information. For example, in one embodiment, a first user might pass the unique identifiable information to a second user, such that the second user can reuse or reconfigure a trusted connection established by the first user. Finally, computer instructions are instantiated 512 onto a computer readable medium configured to enable reconfiguration of the trusted connection with or without re-authentication. The method 500 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable storage medium having computer usable program code programmed for establishing a reusable connection within a trusted context, the computer program product comprising operations for:
    defining a trusted context between a middleware server and a data server, the trusted context defined by a trusted context definition;
    establishing a trusted connection between the middleware server and the data server based on the trusted context definition by accessing a set of connection retrieval interfaces that enable interoperability within the trusted context among a plurality of distinct connection types, and selecting a connection retrieval interface for use in establishing the trusted connection in response to a connection retrieval request, the connection retrieval request identifying a connection type, the set of connection retrieval interfaces comprising a pooled connection interface for establishing a pooled connection within the trusted context and a distribution transaction connection interface for establishing a distribution transaction connection within the trusted context;
    authenticating the middleware server to the data server;
    saving unique identifiable information regarding the trusted connection in a persistent storage such that the connection may be reused without re-authentication;
    reusing the trusted connection without re-authentication based on the unique identifiable information; and
    reconfiguring the trusted connection without re-authentication based on the unique identifiable information, a set of reconfiguration interfaces enabling a client application to selectively request changes to one or more reconfigurable properties of the trusted connection, the requested changes satisfying the trusted context definition.

2. The computer program product of claim 1, wherein the one or more reconfigurable properties comprise one or more of a timeout locking threshold, a username encryption type, a trace file path, and a read/write property.

3. The computer program product of claim 1, the set of connection retrieval interfaces further comprising a normal connection interface that enables compatibility between a normal connection and the trusted context, wherein the set of reconfiguration interfaces enables reconfiguration of the trusted connection from one of a normal connection, a pooled connection, and a distribution transaction connection to another of a normal connection, a pooled connection and a distribution transaction connection without re-authentication.

4. A method for deploying a computer implemented process for establishing a reusable connection within a trusted context, the method comprising:
    instantiating first computer instructions onto a computer readable medium, the first computer instructions stored in a tangible memory and executable by a processor in communication with the memory, the first instructions configured to define a trusted context between a data server comprising at least one processor and a memory and a middleware server comprising at least one processor and a memory, the trusted context defined by a trusted context definition;
    instantiating second computer instructions onto the computer readable medium, the second instructions comprising operations for establishing a trusted connection between the middleware server and the data server based on the trusted context definition by accessing a set of connection retrieval interfaces that enable interoperability within the trusted context and among plurality of distinct connection types, and for selecting a connection retrieval interface for use in establishing the trusted connection in response to a connection retrieval request, the connection retrieval request identifying a connection type, the set of connection retrieval interfaces comprising a pooled connection interface for establishing a pooled connection within the trusted context and a distribution transaction connection interface for establishing a distribution transaction connection within the trusted context;

instantiating third computer instructions onto the computer readable medium, the third instructions comprising an authentication module that authenticates the middleware server to the data server by accessing a set of authentication protocol interfaces that enable interoperability between the trusted context and a plurality of distinct authentication protocols, the authentication module comprising a Kerberos protocol interface that enables interoperability between the trusted context and a Kerberos authentication protocol, a distributed computing environment (DCE) protocol interface that enables interoperability between the trusted context and a DCE authentication protocol, and a user name and password interface that enables interoperability between the trusted context and a user name and password authentication protocol;

instantiating fourth computer instructions onto the computer readable medium, the fourth instructions configured to generate and store unique identifiable information regarding the trusted connection in a persistent storage;

instantiating fifth computer instructions onto the computer readable medium, the fifth instructions configured to enable reuse of the trusted connection without re-authentication based on the unique identifiable information; and instantiating sixth computer instructions onto the computer readable medium, the sixth instructions reconfiguring the trusted connection without re-authentication in response to a request to change one or more reconfigurable properties of the trusted connection, the requested changes satisfying the trusted context definition.

5. An apparatus to establish a reusable and reconfigurable connection within a trusted context, the apparatus comprising:
 a trusted context definition interface configured to communicate with a data server to define a trusted context between a middleware server and the data server, the data server comprising at least one processor and a memory, the trusted context defined by a trusted context definition;
 a set of connection retrieval interfaces that establish a trusted connection between the middleware server and the data server based on the trusted context definition and that enable interoperability within the trusted context and among plurality of distinct connection types, wherein a connection retrieval interface is selected for use in establishing the trusted connection in response to a connection retrieval request, the connection retrieval request identifying a connection type, the set of connection retrieval interfaces comprising a pooled connection interface for establishing a pooled connection within the trusted context and a distribution transaction connection interface for establishing a distribution transaction connection within the trusted context;
 an authentication module that authenticates the middleware server to the data server by accessing a set of authentication protocol interfaces that enable interoperability between the trusted context and a plurality of distinct authentication protocols, the authentication module comprising a Kerberos protocol interface that enables interoperability between the trusted context and a Kerberos authentication protocol, a distributed computing environment (DCE) protocol interface that enables interoperability between the trusted context and a DCE authentication protocol, and a user name and password interface that enables interoperability between the trusted context and a user name and password authentication protocol, wherein the authentication module saves unique identifiable information regarding the trusted connection in a persistent storage such that the connection may be reused without re-authentication;
 a set of connection reuse interfaces configured to enable reuse of the trusted connection with or without re-authentication based on the unique identifiable information; and
 a set of reconfiguration interfaces that reconfigure the trusted connection without re-authentication based on the unique identifiable information, the set of reconfiguration interfaces responsive to change requests from a client application to selectively change one or more reconfigurable properties of the trusted connection, the requested changes satisfying the trusted context definition.

6. The apparatus of claim 5, wherein the one or more reconfigurable properties comprise one or more of a timeout locking threshold, a username encryption type, a trace file path, and a read/write property.

7. The apparatus of claim 5, wherein the set of connection retrieval interfaces further comprises a normal connection interface for establishing a normal connection with the trusted context.

8. A system for establishing a reusable and reconfigurable connection within a trusted context, the system comprising:
 a middleware server enabled to establish a trusted connection within a trusted context;
 a data server comprising a processor and a memory in electronic communication with the middleware server and enabled to establish the trusted connection within the trusted context with the middleware server;
 at least one client in electronic communication with the middleware server and enabled to request a trusted connection within a trusted context;
 at least one database in electronic communication with the data server; and
 a middleware trusted context driver comprising:
 a trusted context definition interface configured to communicate with the data server to define the trusted context between the middleware server and the data server, the trusted context defined by a trusted context definition;
 a set of connection retrieval interfaces that establish the trusted connection between the middleware server and the data server based on the trusted context definition and that enable interoperability within the trusted context and among plurality of distinct connection types, wherein a connection retrieval interface is selected for use in establishing the trusted connection in response to a connection retrieval request, the connection retrieval request identifying a connection type, the set of connection retrieval interfaces comprising a pooled connection interface for establishing a pooled connection within the trusted context and a distribution transaction connection interface for establishing a distribution transaction connection within the trusted context;

an authentication module that authenticates the middleware server to the data server by accessing a set of authentication protocol interfaces that enable interoperability between the trusted context and a plurality of distinct authentication protocols, the authentication module comprising a Kerberos protocol interface that enables interoperability between the trusted context and a Kerberos authentication protocol, a distributed computing environment (DCE) protocol interface that enables interoperability between the trusted context and a DCE authentication protocol, and a user name and password interface that enables interoperability between the trusted context and a user name and password authentication protocol, the authentication module configured to generate and store unique identifiable information regarding the trusted connection in a persistent storage;

a set of connection reuse interfaces configured to enable reuse of the trusted connection without re-authentication based on the unique identifiable information; and a set of reconfiguration interfaces that reconfigure the trusted connection without re-authentication based on the unique identifiable information, the set of reconfiguration interfaces responsive to change requests from the client application to selectively change one or more reconfigurable properties of the trusted connection, the requested changes satisfying the trusted context definition.

9. A method for establishing a reusable connection within a trusted context, the method comprising:

defining a trusted context between a data server comprising at least one processor and a memory and a middleware server, the trusted context defined by a trusted context definition;

establishing a trusted connection between the middleware server and the data server based on the trusted context definition by accessing a set of connection retrieval interfaces that enable interoperability between the trusted context and a plurality of distinct connection types, and selecting a connection retrieval interface for use in establishing the trusted connection in response to a connection retrieval request, the connection retrieval request identifying a connection type, the set of connection retrieval interfaces comprising a pooled connection interface for establishing a pooled connection within the trusted context and a distribution transaction connection interface for establishing a distribution transaction connection within the trusted context;

authenticating the trusted connection between the middleware server and the data server by accessing an authentication module comprising a set of authentication protocol interfaces that enable interoperability between the trusted context and a plurality of distinct authentication protocols, the set of authentication protocol interfaces comprising a Kerberos protocol interface that enables interoperability between the trusted context and a Kerberos authentication protocol, a distributed computing environment (DCE) protocol interface that enables interoperability between the trusted context and a DCE authentication protocol, and a user name and password interface that enables interoperability between the trusted context and a user name and password authentication protocol;

generating and storing unique identifiable information regarding the trusted connection in a persistent storage;

reusing the trusted connection without re-authentication based on the unique identifiable information; and reconfiguring the trusted connection without re-authentication based on the unique identifiable information.

10. The method of claim 9, wherein reconfiguring the trusted connection comprises changing the trusted connection from one of a normal connection, a pooled connection, and a distribution transaction connection to another of a normal connection, a pooled connection and a distribution transaction connection without re-authentication.

* * * * *